United States Patent
Chintakindi et al.

(10) Patent No.: US 11,615,478 B2
(45) Date of Patent: Mar. 28, 2023

(54) SELECTIVELY SHARED VEHICLE-BASED TELEMATICS

(71) Applicant: Allstate Insurance Company, Northbrook, IL (US)

(72) Inventors: Sunil Chintakindi, Menlo Park, CA (US); Howard Hayes, Glencoe, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/179,882

(22) Filed: Feb. 19, 2021

(65) Prior Publication Data

US 2022/0270177 A1   Aug. 25, 2022

(51) Int. Cl.
*G06Q 40/08* (2012.01)
*G07C 5/00* (2006.01)
*H04W 4/029* (2018.01)
*G07C 5/08* (2006.01)

(52) U.S. Cl.
CPC ............ *G06Q 40/08* (2013.01); *G07C 5/008* (2013.01); *G07C 5/0841* (2013.01); *H04W 4/029* (2018.02)

(58) Field of Classification Search
CPC ........ G06Q 40/08; G07C 5/008; H04W 4/029
See application file for complete search history.

(56) References Cited

U.S. PATENT DOCUMENTS

| | | | |
|---|---|---|---|
| 8,577,703 B2 * | 11/2013 | McClellan | G07C 5/008 705/7.42 |
| 8,966,654 B1 | 2/2015 | Kwak | |
| 9,900,315 B2 | 2/2018 | Yusuf et al. | |
| 10,212,269 B2 | 2/2019 | Iyer et al. | |
| 10,304,265 B1 * | 5/2019 | Hsu-Hoffman | G06Q 30/0279 |
| 10,331,903 B2 | 6/2019 | Retter et al. | |
| 10,366,219 B2 * | 7/2019 | Kurian | G06F 3/167 |
| 10,474,800 B2 | 11/2019 | Kurian | |
| 10,664,917 B1 * | 5/2020 | Wasserman | G01C 21/3453 |
| 10,687,030 B2 | 6/2020 | Schimelpfenig et al. | |
| 10,703,379 B1 * | 7/2020 | Harvey | B60W 40/09 |

(Continued)

FOREIGN PATENT DOCUMENTS

WO   2018048870 A1   3/2018

OTHER PUBLICATIONS

"Geotab Adds Privacy Mode for Personal Use", Telematics, Automotive Fleet, May 23, 2018.

(Continued)

*Primary Examiner* — Scott S Trotter
*Assistant Examiner* — William D Newlon
(74) *Attorney, Agent, or Firm* — Polsinelli PC

(57) ABSTRACT

Methods, computer-readable media, software, and apparatuses include activating a telematics system to collect telematics data associated with operation of a vehicle during a first window of time, receiving, by a computing device associated with the vehicle, telematics data from the telematics system during the first window of time, identifying one or more parameters associated with operation of the vehicle based on analyzing the telematics data, determining whether the one or more parameters meets a safe driving threshold, and upon determining that the one or more parameters meets the safe driving threshold, transmitting the telematics data to a third party server or device.

18 Claims, 6 Drawing Sheets

(56) References Cited

U.S. PATENT DOCUMENTS

| | | | |
|---|---|---|---|
| 10,832,261 B1* | 11/2020 | Chan | G06Q 40/025 |
| 2005/0137757 A1* | 6/2005 | Phelan | G07C 5/02 |
| | | | 701/1 |
| 2012/0122525 A1 | 5/2012 | Miller et al. | |
| 2012/0130727 A1* | 5/2012 | Ahmed | G06Q 30/02 |
| | | | 705/1.1 |
| 2016/0370202 A1* | 12/2016 | James | G06Q 10/06 |
| 2017/0076395 A1 | 3/2017 | Sedlik | |
| 2017/0270615 A1* | 9/2017 | Fernandes | G08G 5/0039 |
| 2018/0025430 A1 | 1/2018 | Perl et al. | |
| 2018/0075380 A1 | 3/2018 | Perl et al. | |
| 2019/0367039 A1 | 12/2019 | Persia et al. | |
| 2020/0219337 A1* | 7/2020 | Kwak | G06F 21/6272 |
| 2021/0042844 A1* | 2/2021 | Potter | B60R 25/04 |
| 2021/0272207 A1* | 9/2021 | Fields | G08G 1/096827 |

OTHER PUBLICATIONS

"Bluetooth Button/Privacy", Crowd Support Forum, Teitonika GPS, downloaded from <https://community.teitonika-gps.com/3221/bluetooth-button-privacy> on Jul. 13, 2020.

"Apps and Features", OBDeleven, downloaded from <https://obdeleven.com/en/apps-and-features> on Jul. 12, 2020.

Khedkar, et al. "Driver Evaluation System Using Mobile Phone", International Journal of Computer Science and Infomnation Technologies, vol. 6 (3), 2015, 2738-2745, downloaded from <www.ijcsit.com>.

"The Foundation of the FICO® Score Telematics Analytic Suite", FICO Decisions, Fair Isaac Corporation, 2017.

* cited by examiner

Safe Driving Program Enrollment

Would you like to enroll in the Safe Driving Program?
Yes    No

Enrollment in the Safe Driving Program could reduce your premium by as much as 30%.

Would you like to be notified before your data is shared?
Yes    No

Back

FIG. 6

Safe Driving Notification

Congratulations! Your safe driving has unlocked a discount on your insurance premium of 30%. Would you like to share your driving data with Insurance Company to receive this discount?

Yes, share my data so I can receive this discount
No, I do not wish to share my data at this time
View driving data Back

FIG. 7

SELECTIVELY SHARED VEHICLE-BASED TELEMATICS

TECHNICAL FIELD

Aspects of the disclosure generally relate to methods and computer systems, including one or more computers particularly configured and/or executing computer software and a vehicle telematics system operably connected to the one or more computers. More specifically, aspects of this disclosure relate to systems and methods for analysis of vehicle telematics data, and selectively sharing such data with one or more third parties.

BACKGROUND

Vehicle telematics data may be valuable for a number of purposes. Such vehicle telematics data includes data from measurements related to a vehicle's operation. For example, vehicle telematics data may include global positioning system (GPS) coordinates of a vehicle that allow the location of the vehicle to be tracked. Also, for example, vehicle telematics data may include acceleration data of a vehicle that allow the speed of the vehicle to be tracked. Vehicle telematics data may include other vehicle operational data as well. Auto-insurance providers are interested in this information so as to better evaluate the risk associated with customers and potential customers. Other organizations may also be interested in such information to determine a person's behavior (e.g., driving behavior, risk tolerance, or the like). Moreover, parents or other guardians may also be interested in monitoring a vehicle carrying their children or other dependents. Users may elect to have driving information captured and/or shared with one or more entities, but this may result in a perceived lack of privacy.

As technology advances and adoption of such technology increases, more and more vehicle telematics data may be collected (e.g., with permission of the user) and more and more people or entities may desire access to this data. Many individuals, however, may find the rise as such technology results in a lack of privacy. As such, challenges for making vehicle telematics data accessible while still maintaining individuals' privacy may emerge. As more vehicle telematics data becomes available, it becomes more difficult to strike a balance between offering a sense of privacy to users, while still providing information when needed or relevant. On one hand, reporting all information may cause people to find such vehicle telematics systems intrusive, and may therefore completely opt out of programs for monitoring vehicle behavior. On the other hand, reporting too little information may limit the value of such information to third parties. Accordingly, new systems, devices, methodologies, and the like are desired to collect vehicle telematics data and maintain the privacy of such data.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer-readable storage media, software, systems, and apparatuses for collecting and analyzing vehicle telematics data (e.g., with user permission), but only selectively sharing such telematics with third parties upon meeting certain thresholds or requirements. In particular, based on collected telematics data indicating that a safe driving threshold has been met, such telematics data may then be selectively shared with third parties. Accordingly, such telematics data collection and analysis may be performed locally prior to sharing any telematics data with remote, third parties.

Advantageous solutions to the problems presented above, and other issues which will be apparent upon the reading of the present disclosure, may be to provide an apparatus that includes a telematics system configured to collect telematics data associated with operation of a vehicle, a communication interface, one or more processors, and memory storing instructions that, when executed by the one or more processors, cause the apparatus to activate the telematics system to collect telematics data associated with operation of the vehicle during a first window of time, analyze the telematics data to identify one or more parameters associated with operation of the vehicle, determine whether the one or more parameters meets a safe driving threshold, and upon determining that the one or more parameters meets the safe driving threshold, transmit, via the communication interface, the telematics data to a remote computing device associated with a third party.

In some aspects, the memory may further store instructions that, when executed by the one or more processors, cause the apparatus to display, on a display of the apparatus, a sharing prompt indicating that the one or more parameters meets the safe driving threshold. Transmitting the telematics data to the remote computing device may then include receiving a user interaction with the sharing prompt indicating a confirmation to share the telematics data with the third party. In some examples, activating the telematics system may include receiving a notification that a driver associated with the vehicle has enrolled in a safe driver program with the third party. The safe driver program may include an indication that the telematics data will not be transmitted to the third party until the safe driving threshold is met. In some examples, the third party may be an insurance entity, the safe driving threshold may be associated with a discounted insurance premium. In such examples, the memory may further store instructions that, when executed by the one or more processors, cause the apparatus to display, on a display of the apparatus, a discount notification indicating that the discounted insurance premium is available to an insurance policy holder of the vehicle, upon determining that the one or more parameters meets the safe driving threshold.

In some embodiments, the apparatus may be located within, integrated with, or mounted to the vehicle. The telematics system may include a Global Positioning System (GPS), and the telematics data may then include geo-location data and the one or more parameters may include a geographic zone of preferred driving. In such examples, the memory may further store instructions that, when executed by the one or more processors, cause the apparatus to determine whether the geo-location data is indicative of the vehicle staying within the geographic zone of preferred driving.

In some examples, the apparatus may include a display, and a portion of the display may provide a first graphic indicating that telematics data is not being shared with the third party, and a second graphic indicating that data is being shared with the third party.

In some examples, the one or more parameters associated with the operation of the vehicle may include at least one of: destination information corresponding to a trip, a time range of the trip, velocity events that occurred during the trip, or braking events that occurred during the trip. In some aspects, analyzing the telematics data to identify one or more parameters associated with operation of the vehicle may include calculating a driving behavior score during the first window of time.

In accordance with further aspects of the present disclosure, a method disclosed herein may include activating a telematics system to collect telematics data associated with operation of a vehicle during a first window of time, receiving, by a computing device associated with the vehicle, telematics data from the telematics system during the first window of time, identifying, by the computing device, one or more parameters associated with operation of the vehicle based on analyzing the telematics data, determining, by the computing device, whether the one or more parameters meets a safe driving threshold associated with a discounted insurance premium for a driver of the vehicle, and upon determining that the one or more parameters meets the safe driving threshold, transmitting the telematics data to a remote server associated with an insurance entity.

In some aspects, the method may further include displaying, on a display of the computing device, a sharing prompt indicating that the one or more parameters meets the safe driving threshold, and receiving, at the computing device, a user interaction with the sharing prompt indicating a confirmation to share the telematics data with the insurance entity. In such aspects, transmitting the telematics data to the remote server may be performed responsive to receiving the user interaction indicating the confirmation to share the telematics data with the insurance entity. In some examples, activating the telematics system may include receiving a notification that a driver associated with the vehicle has enrolled in a safe driver program with the insurance entity. In such examples, the safe driver program may include an indication that the telematics data will not be transmitted to the insurance entity until the safe driving threshold is met.

In some aspects, the method may further include displaying, on a display of the computing device, a discount prompt indicating that the discounted insurance premium is available to an insurance policy holder of the vehicle, upon determining that the one or more parameters meets the safe driving threshold. In some aspects, identifying the one or more parameters associated with operation of the vehicle may include calculating a driving behavior score during the first window of time.

In some embodiments, the method may further include pairing the computing device with a vehicle control computer associated with the vehicle, and receiving an indication of a positive ignition event from the vehicle control computer. In such embodiments, activating the telematics system may be performed responsive to receiving the indication of the positive ignition event.

In accordance with further aspects of the present disclosure, a system disclosed herein may include a first computing device and a second computing device. The first computing device may be associated with a vehicle, and may include a telematics system configured to collect telematics data during operation of the vehicle, a wireless communication interface, a processor, and memory storing instructions that, when executed by the processor, cause the first computing device to receive telematics data from the telematics system during a first window of time, identify, based on the telematics data, one or more parameters associated with operation of the vehicle, determine whether the one or more parameters meets a safe driving threshold, and marking the one or more parameters as suitable for sharing upon determining that the one or more parameters meets the safe driving threshold. The second computing device may be in signal communication with the first computing device, and may include a processor, and memory storing instructions that, when executed by the processor, cause the second computing device to receive, from the first computing device, the one or more parameters marked as suitable for sharing.

In some aspects, the telematics system of the first computing device may include a Global Positioning System (GPS), and the one or more parameters may include a geographic zone of preferred driving. In such aspects, the memory of the first computing device may further store instructions that, when executed by the processor, cause the first computing device to determine whether the telematics data is indicative of the vehicle staying within the geographic zone of preferred driving.

In some aspects, the telematics system of the first computing device may include a biometric device configured to collect biometric data associated with an operator of the vehicle, and the one or more parameters may include biometric data associated with an operator of the vehicle. The telematics system of the first computing device may include one or more sensors configured to collect data associated with movement of the vehicle, and wherein the one or more parameters may include at least one of: destination information corresponding to a trip, a time range of the trip, velocity events that occurred during the trip, or braking events that occurred during the trip. In some examples, analyzing the one or more parameters may include calculating a driving behavior score associated with the telematics data during the first window of time.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 6 and 7 illustrate example vehicle telematics application interfaces in accordance with one or more aspects described herein.

DETAILED DESCRIPTION

In accordance with various aspects of the disclosure, methods, computer-readable media, software, and apparatuses are disclosed for collecting and analyzing vehicle telematics data and selectively sharing such data, e.g., upon determining that a driving data threshold has been met. As described herein, one or more user verifications for sharing vehicle telematics data may be facilitated using one or more related user prompts.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

As will be appreciated by one of skill in the art upon reading the following disclosure, various aspects described herein may be embodied as a method, a specially-programmed computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

Figure 1:
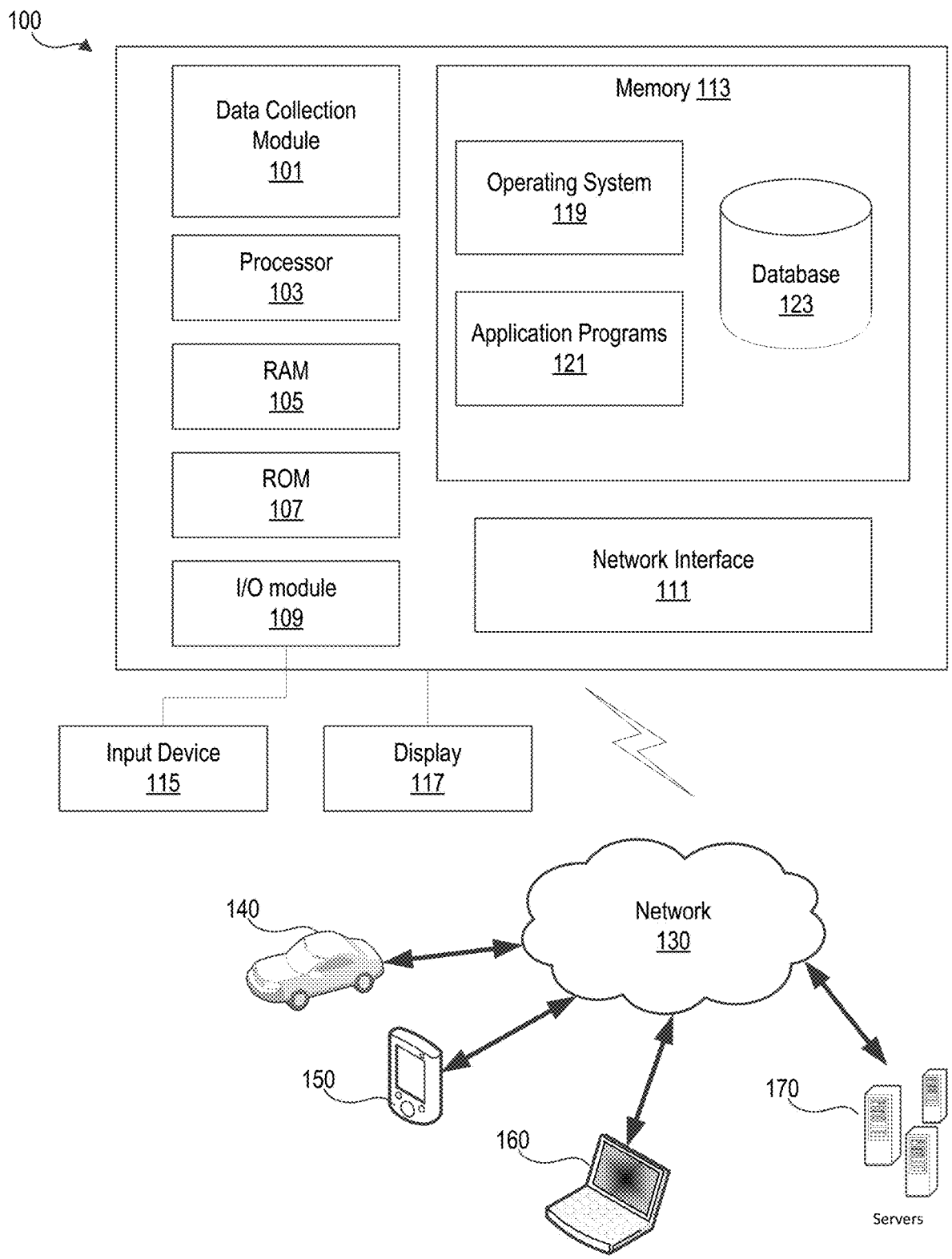
FIG. 1 illustrates an example network environment and computing systems that may be used in accordance with one or more aspects described herein.

In one or more arrangements, aspects of the present disclosure may be implemented with a computing device. FIG. 1 illustrates a block diagram of an example computing environment including vehicle telematics assessment device 100 (also referred to herein as a vehicle telematics analysis device) that may be used in accordance with one or more aspects described herein. The vehicle telematics assessment device 100 may be a computing device, such as a personal computer (e.g., a desktop computer), server, laptop computer, notebook, tablet, smartphone, etc. The vehicle telematics assessment device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), field programmable gate arrays (FPGA), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, vehicle telematics assessment device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the vehicle telematics assessment device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the vehicle telematics assessment device 100 may provide input data, and may also include one or more of a speaker for providing audio output and a video display device for providing textual, audiovisual and/or graphical output. The I/O module 109 may also be configured to be connected to a display device 117, such as a monitor, television, touchscreen, etc., and may include a graphics card. For example, the I/O module 109 may be configured to receive biometric data from a user. The display device 117 and input device 115 are shown as separate elements from the vehicle telematics assessment device 100; however, they may be within the same structure. On some vehicle telematics assessment devices 100, the input device 115 may be operated by a driver of a vehicle to interact with the data collection module 101, including providing information about vehicle information, driver preferences, driver information, account information, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the vehicle telematics assessment device 100 to perform various functions. For example, memory 113 may store software used by the vehicle telematics assessment device 100, such as an operating system 119 and application programs 121, and may include an associated database 123.

Although not shown in FIG. 1, various elements within memory 113 or other components in the vehicle telematics assessment device 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 170 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 170. These types of caches and others may be included in various embodiments, and may provide potential advantages in certain implementations of retrieving and analyzing driving data, such as faster response times and less dependence on network conditions when transmitting/receiving driving data from a vehicle 140 (e.g., from vehicle-based devices such as on-board vehicle computers, short-range vehicle communication systems, telematics devices), data from one or more enterprise servers 170, etc.

The network interface 111 may allow vehicle telematics assessment device 100 to connect to and communicate with a network 130. The network 130 may be any type of network, including a local area network (LAN) and/or a wide area network (WAN), such as the Internet, a cellular network, or satellite network. Through network 130, vehicle telematics assessment device 100 may communicate one or more other computing devices such as a user device 150 or a user device 160 (e.g., laptops, notebooks, smartphones, tablets, personal computers, servers, vehicles, home management devices, home security devices, smart appliances, etc.) associated with a driver of vehicle 140. Through network 130, vehicle telematics assessment device 100 may also communicate with one or more enterprise servers 170 to exchange related information and data.

Network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, network interface 111 may use various protocols, including TCP/IP, Ethernet, File Transfer Protocol (FTP), Hypertext Transfer Protocol (HTTP), etc., to communicate with user device 150, user device 160, and enterprise servers 170.

It will be appreciated that the network connections shown are illustrative and other means of establishing a communications link between the computers may be used. The existence of any of various network protocols such as Transmission Control Protocol/Internet Protocol ("TCP/IP"), Ethernet, File Transfer Protocol ("FTP"), Hypertext Transfer Protocol ("HTTP") and the like, and of various wireless communication technologies such as the Global System for Mobile Communications ("GSM"), Code Division Multiple Access ("CDMA"), Wi-Fi, Long-Term Evolution ("LTE"), and Worldwide Interoperability for Microwave Access ("WiMAX"), is presumed, and the various computing devices and mobile device location and configuration system components described herein may be configured to communicate using any of these network protocols or technologies.

Software may be stored within memory 113 and/or may provide instructions to processor 103 for enabling the vehicle telematics assessment device 100 to perform various functions described herein. For example, memory 113 may store software used by vehicle telematics assessment device 100, such as an operating system 119, application programs 121, and an associated internal database 123. Processor 103 and its associated components may allow the vehicle telematics assessment device 100 to execute a series of computer-readable instructions to transmit or receive sensor data, analyze sensor data, detect vehicle operation, and issue notifications and/or alerts as described herein.

The vehicle telematics assessment device 100 may operate in a networked environment supporting connections to one or more remote computers, such as user device 150 and user device 160. The vehicle telematics assessment device 100, and related user device 150 and user device 160, may be in signal communication with special-purpose devices installed in vehicles, other mobile devices that may travel within vehicles, or devices outside of vehicles that are configured to receive and process sensor data. Thus, the vehicle telematics assessment device 100, user device 150, and user device 160 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the vehicle telematics assessment device 100.

The network connections depicted in FIG. 1 may include a local area network (LAN) and a wide area network (WAN), and a wireless telecommunications network, but may also include other networks. When used in a LAN networking environment, the vehicle telematics assessment device 100 may be connected to the LAN through a network interface or adapter. When used in a WAN networking environment, the vehicle telematics assessment device 100 may include a modem or other means for establishing communications over the WAN, such as network 130 (e.g., the Internet). When used in a wireless telecommunications network, such as network 130, the vehicle telematics assessment device 100 may include one or more transceivers, digital signal processors, and additional circuitry and software for communicating with user device 150 and user device 160 (e.g., mobile phones, short-range vehicle communication systems, vehicle telematics devices) via one or more network devices (e.g., base transceiver stations) in the wireless network 130.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and mobile device location and configuration system components described herein may be configured to communicate using any of these network protocols or technologies.

Although not shown in FIG. 1, a security and integration layer may be provided as part of vehicle telematics assessment device 100, through which communications may be sent and managed between devices of the vehicle telematics assessment device 100 (e.g., a user's personal mobile device, a vehicle-based system, external server, etc.) and/or other remote devices and remote networks. The security and integration layer may comprise one or more separate computing devices, such as web servers, authentication servers, and/or various networking components (e.g., firewalls, routers, gateways, load balancers, etc.), having some or all of the elements described above with respect to the vehicle telematics assessment device 100. As an example, a security and integration layer of a mobile computing device, vehicle-based device, or a server operated by an insurance provider, financial institution, governmental entity, or other organization, may comprise a set of web application servers configured to use secure protocols and to insulate the vehicle telematics assessment device 100 from external. In some cases, the security and integration layer may correspond to a set of dedicated hardware and/or software operating at the same physical location and under the control of same entities as the vehicle telematics assessment device 100. For example, the security and integration layer may correspond to one or more dedicated web servers and network hardware in an organizational datacenter or in a cloud infrastructure supporting a cloud-based mobile device location and configuration system. In other examples, the security and integration layer may correspond to separate hardware and software components which may be operated at a separate physical location and/or by a separate entity.

As discussed below, the data transferred to and from various devices in the vehicle telematics assessment device 100 may include secure and sensitive data, such as driving data, driving locations, vehicle data, and confidential individual data such as insurance data associated with vehicle occupants. In at least some examples, transmission of the data may be performed based on one or more user permissions provided. Therefore, it may be desirable to protect transmissions of such data by using secure network protocols and encryption, and also to protect the integrity of the data when stored on in a database or other storage in a mobile device, analysis server, or other computing devices in the vehicle telematics assessment device 100, by using a security and integration layer to authenticate users and restrict access to unknown or unauthorized users. In various implementations, security and integration layer may provide, for example, a file-based integration scheme or a service-based integration scheme for transmitting data between the various devices in the vehicle telematics assessment device 100. Data may be transmitted through the security and integration layer, using various network communication protocols. Secure data transmission protocols and/or encryption may be used in file transfers to protect to integrity of the driving data, for example, File Transfer Protocol (FTP), Secure File Transfer Protocol (SFTP), and/ or Pretty Good Privacy (PGP) encryption.

In other examples, one or more web services may be implemented within the vehicle telematics assessment device 100 and/or the security and integration layer. The web services may be accessed by authorized external devices and users to support input, extraction, and manipulation of the data (e.g., driving data, location data, confidential personal data, etc.) between the vehicle telematics assessment device 100 and other devices, such as user device 150 and user device 160. Web services built to support the vehicle telematics assessment device 100 may be cross-domain and/or cross-platform, and may be built for enterprise use. Such web services may be developed in accordance with various web service standards, such as the Web Service Interoperability (WS-I) guidelines.

In some examples, a movement data and/or driving data web service may be implemented in the security and integration layer using the Secure Sockets Layer (SSL) or Transport Layer Security (TLS) protocol to provide secure connections between servers (e.g., data collection module 101) and various other devices (e.g., user device 150, user device 160, data analysis servers, etc.). SSL or TLS may use HTTP or HTTPS to provide authentication and confidentiality.

In other examples, such web services may be implemented using the WS-Security standard, which provides for secure SOAP messages using XML encryption. In still other examples, the security and integration layer may include specialized hardware for providing secure web services. For example, secure network appliances in the security and integration layer may include built-in features such as hardware-accelerated SSL and HTTPS, WS-Security, and firewalls. Such specialized hardware may be installed and configured in the security and integration layer in front of the web servers, so that any external devices may communicate directly with the specialized hardware.

Additionally, one or more application programs 121 may be used by the vehicle telematics assessment device 100 (e.g., driving assessment software applications, and the like), including computer executable instructions for receiving and storing data from telematics devices, and/or vehicle-based systems, analyzing the data, issuing notifications regarding the data, and/or performing other related functions as described herein.

Figure 2:
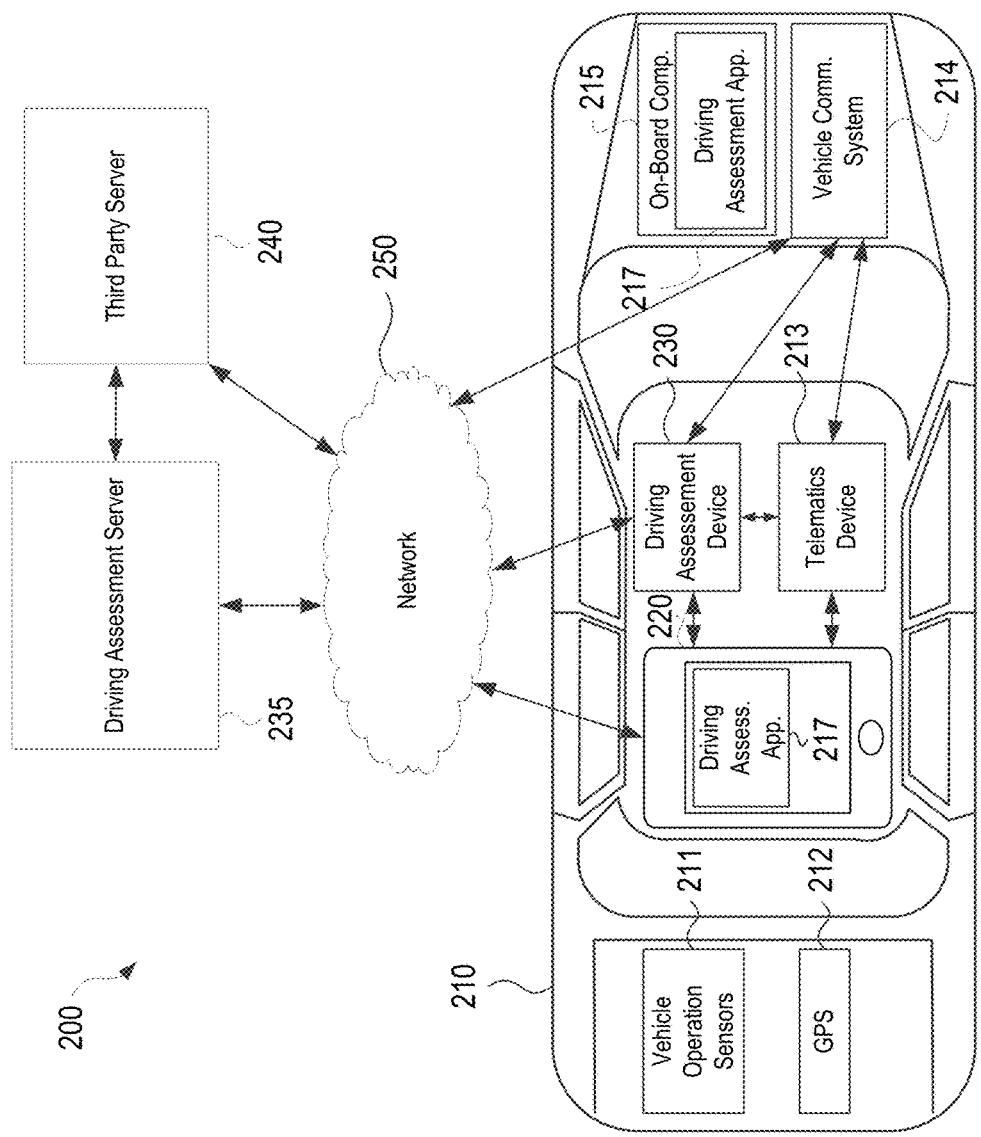
FIG. 2 illustrates an example computing environment for vehicle telematics based driving analysis in accordance with one or more aspects described herein.

FIG. 2 depicts an illustrative computing environment for vehicle telematics based driving assessments in accordance with one or more aspects of the present disclosure. The driving assessment system 200 may include vehicle 210, driving assessment server 235, and one or more third party computing devices 240. The vehicle 210 may include one or more components associated therewith such as vehicle operation sensors 211, GPS 212, telematics device 213, vehicle communication system 214, on-board computer 215, driving assessment device 230 and the like. Additionally, mobile device 220 may be included in vehicle 210. In some instances, the mobile device 220 may be associated with an owner, driver, or passenger of vehicle 210. Although FIG. 2 illustrates only one vehicle 210, the driving assessment system 200 may be configured to communicate with multiple vehicles 210 and associated components.

The vehicle 210 and one or more components associated therewith (e.g., vehicle operation sensors 211, GPS 212, telematics device 213, vehicle communication system 214, on-board computer 215, and the like), mobile device 220, driving assessment device 230, and one or more third party computing devices 240 may be configured to communicate with each other through network 250. Each component shown in FIG. 2 may be implemented in hardware, software, or a combination of the two. Additionally, each component of the driving assessment system 200 may include a computing device (or system) having some or all of the structural components described below in regard to vehicle telematics assessment device 100 of FIG. 1.

Vehicle 210 of the driving assessment system 200 may be an automobile, motorcycle, scooter, bus, van, truck, semi-truck, train, boat, recreational vehicle, or other vehicle. The vehicle 210 may further be an autonomous vehicle, semi-autonomous vehicle, or non-autonomous vehicle. In some examples, vehicle 210 may include vehicle operation/performance sensors 211 capable of detecting, recording, and transmitting various vehicle performance and/or operational data. For example, sensors 211 may detect, store, and transmit data corresponding to the vehicle's speed, rates of acceleration and/or deceleration, braking, swerving, and the like. Sensors 211 also may detect, store and/or transmit data received from the vehicle's internal systems, such as impact to the body of the vehicle, air bag deployment, headlight usage, brake light operation, door opening and closing, door locking and unlocking, cruise control usage, hazard light usage, windshield wiper usage, horn usage, turn signal usage, seat belt usage, phone and radio usage within the vehicle, internal decibel levels, and other data collected by the vehicle's computer systems.

Sensors 211 also may detect, store, and/or transmit data relating to moving violations and the observance of traffic signals and signs by the vehicle 210. Additional sensors 211 may detect, store, and transmit data relating to the maintenance of the vehicle 210, such as the engine status, oil level, engine coolant temperature, odometer reading, level of fuel in the fuel tank, engine revolutions per minute (RPMs), and/or tire pressure. The sensors 211 of vehicle 210 may further include one or more cameras and proximity sensors capable of recording additional conditions inside or outside of the vehicle 210. Internal cameras may detect conditions such as the number of the passengers in the vehicle 210, and potential sources of driver distraction within the vehicle (e.g., pets, phone usage, and unsecured objects in the vehicle). External cameras and proximity sensors may be configured to detect nearby vehicles, vehicle spacing, traffic levels, road conditions and obstacles, traffic obstructions, animals, cyclists, pedestrians, precipitation levels, light levels, sun position, and other conditions that may factor into driving operations of vehicle 210.

Additionally, vehicle sensors 211 may be configured to independently transmit the above-mentioned data to one or more computing devices and/or systems including telematics device 213, on-board computer 215, mobile device 220, driving assessment device 230, driving assessment server 235, and/or third party computing devices 240. In some instances, the data transmission to the mobile device 220, driving assessment device 230, driving assessment server 235, and/or third party computing device(s) 240 may be performed via on-board computer 215. In such cases, the on-board computer 215 may be configured to transmit the data received from vehicle sensors 211 to mobile device 220, driving assessment device 230, driving assessment server 235, and/or third party computing device(s) 240 by way of vehicle communication system 214.

Vehicle 210 may include a Global Positioning System (GPS) 212 which may be used to generate data corresponding to the position, heading, orientation, location, velocity, and/or acceleration of vehicle 210. GPS 212 may be configured to independently transmit the above-mentioned data to one or more computing systems including telematics device 213, on-board computer 215, mobile device 220, driving assessment device 230, driving assessment server 235, and/or third party computing devices 240. In some instances, the data transmission to the mobile device 220, driving assessment device 230, driving assessment server 235, and/or third party computing device(s) 240 may be performed via on-board computer 215. In such cases, the on-board computer 215 may be configured to transmit the data received from GPS 212 to mobile device 220, driving assessment server 235, and/or third party computing device(s) 240 by way of vehicle communication system 214.

Telematics device 213 may be configured to receive the vehicle performance and/or operational data and vehicle locational information in the form of a data stream from on-board computer 215 via a data port, Bluetooth interface, or any comparable communication interface of the vehicle 210. For example, telematics device 213 may include an on-board diagnostic (OBD) device adapter and may be connected to an OBD port of the vehicle 210 through which on-board computer 215 may be configured to transmit data to telematics device 213. In certain embodiments, telematics device 213 may be configured to receive vehicle performance and/or operational data and vehicle locational information directly from vehicle sensors 211, GPS 212, on-board computer 215, and/or mobile device 220 via a wired or wireless connection. Telematics device 213 may include a memory to store data received from vehicle sensors 211, GPS 212, on-board computer 215, and/or mobile device 220.

The vehicle performance and/or operational data and vehicle locational information may be collected with appropriate permissions (e.g., from the driver, vehicle owner, and the like) and may include operational data from an industry standard port such as a SAE-1962 connector, or an on board diagnostic ("OBD") port or other vehicle data acquiring component. For example, operation data accessible via the OBDII port includes speed and engine throttle position or other variable power controls of the vehicle power source. It may also include so called "extended OBDII" or OBDIII datasets that are specific to each manufacturer and also available with appropriate permission such as velocity, acceleration, odometer readings, activation of brakes, degree and duration of steering direction, and implementation of accident avoidance devices such as turning signals, headlights, seatbelts, activation of automated braking systems (ABS), and the like. Other information regarding the operation of the vehicle may be collected such as, but not limited to, interior and exterior vehicle temperature, window displacement, exterior vehicle barometric pressure, exhaust pressure, vehicle emissions, turbo blower pressure, turbo charger RPM, vehicle GPS location, and the like. The system may recognize or be configured to recognize a particular language emitted by the vehicle system and may configure the recording component to receive or convert data in SAE J1850, ISO IS09141 or KWP 2000 formats. Accordingly, U.S. and/or international OBD standards may be accommodated. For instance, data may be collected from a variety of U.S. and/or international port types to permit use in a variety of locations. Alternatively, this step may be performed by a processor after the data is recorded.

Telematics device 213 may also include sensors such as, but not limited, an accelerometer, compass, gyroscope, and GPS. Additionally, telematics device 213 may include antennas to communicate with other devices wirelessly. For example, telematics device 213 may communicate with on-board computer 215, mobile device 220, driving assessment server 235, and/or third party computing device(s) 240 over a wide area network (WAN), cellular network, Wi-Fi network, and the like. Telematics device 213 may also communicate with on-board computer 215 and mobile device 220 via a Bluetooth™ connection. In certain embodiments, telematics device 213 may be configured to establish a secure communication link and/or channel with on-board computer 215, mobile device 220, driving assessment device 230, driving assessment server 235, and/or third party computing device(s) 240.

In some arrangements, telematics device 213 may include a telematics application operating on on-board computer 215 and/or mobile device 220 and/or driving assessment device 230 and may utilize hardware components comprised within on-board computer 215 and/or mobile device 220 and/or driving assessment device 230 (e.g., memory, processors, communication hardware, sensors, and the like) to receive, store, and/or transmit vehicle performance and/or operational data and vehicle locational information.

Vehicle communication systems 214 may be vehicle-based data transmission systems configured to transmit vehicle information and/or operational data and vehicle locational information to external computing systems and/or other nearby vehicles and infrastructure, and to receive data from external computing systems and/or other nearby vehicles and infrastructure. In some examples, communication systems 214 may use the dedicated short-range communications (DSRC) protocols and standards to perform wireless communications between vehicles and/or external infrastructure such as bridges, guardrails, barricades, and the like.

Vehicle communication systems 214 may be implemented using wireless protocols such as WLAN communication protocols (e.g., IEEE 802.11), Bluetooth™ (e.g., IEEE 802.15.1), one or more of the Communication Access for Land Mobiles (CALM) wireless communication protocols and air interfaces, and the like. In certain systems, communication systems 214 may include specialized hardware installed in vehicle 210 (e.g., transceivers, antennas, and the like) to facilitate near field communication (NFC) and/or radio-frequency identification (RFID), while in other examples the communication systems 214 may be implemented using existing vehicle hardware components (e.g., radio and satellite equipment, navigation computers). In some instances, the vehicle communication systems 214 may be configured to transmit and receive data from vehicle sensors 211, GPS 212, telematics device 213, on-board computer 215, mobile device 220, driving assessment device 230, driving assessment server 235, and/or third party computing device(s) 240 over a wide area network (WAN), cellular network, Wi-Fi network, Bluetooth™, RFID, and/or NFC.

On-board computer 215 may contain some or all of the hardware/software components as the vehicle telematics assessment device 100 of FIG. 1. Vehicle control computer 215 may be configured to operate one or more internal vehicle systems and/or components including at least a vehicle sound system, dashboard display and/or heads-up display system, output speakers, interior lighting system, climate control system, ignition system, door locking system, and the like. Similarly, on-board computer 215 may be configured to operate one or more external vehicle systems and/or components including windshield wipers, exterior lighting systems (e.g., headlights, tail lights, running lights, turn signals, emergency lights, etc.), emission and exhaust systems, fuel systems, suspension systems, transmission systems, and the like. In some instances, vehicle control computer 215 may be configured to perform the driving assessment methods as described in further detail below in conjunction with mobile device 220, driving assessment device 230, driving assessment server 235, and/or third party computing device(s) 240.

Additionally, the driving assessment device 230 and/or on-board computer 215 may include a display screen for presenting information to a driver of vehicle 210 pertaining to any of a plurality of applications such as a telematics application, driving assessment application 217, and the like. In some instances, the display screen may be a touch screen and may be configured to receive user touch input. Alternatively, the display screen may not be a touch screen and, instead, the driving assessment device 230 and/or on-board computer 215 may receive user input and provide output through one or more of the input/output modules 109 described in detail in regard to FIG. 1.

In some instances, driving assessment device 230 and/or on-board computer 215 may be configured to perform one or more of the methods and/or processes corresponding to the vehicle telematics based driving assessment as described in further detail below independently and/or in conjunction with one or more sensors and/or computing devices such as sensors 211, GPS 212, telematics device 213, mobile device 220, driving assessment device 230, driving assessment server 235, and/or third party computing device(s) 240. In particular, the driving assessment device 230 and/or on-board computer 215 may be configured to perform the processes in combination with, and/or independently of, vehicle 210 and corresponding components (e.g., sensors 211, GPS 212, and telematics device 213), mobile device 220, driving assessment device 230, and driving assessment server 235, as well as third party computing device(s) 240 in instances in which they are used. In performing such methods, on-board computer 215 may be configured to receive, detect, store, and transmit vehicle performance and/or operational data, vehicle locational information, and/or mobile device usage data. Furthermore, driving assessment device 230 and/or on-board computer 215 may be configured to receive, store, and transmit vehicle performance and/or operational data, vehicle locational information, driving assessment data, third party data, and/or data produced during the performance of the methods corresponding to the vehicle telematics based driving assessment from sensors 211, GPS 212, telematics device 213, mobile device 220, driving assessment device 230, driving assessment server 235, and/or one or more third party computing devices 240.

Mobile computing device 220 may be, for example, a mobile phone, personal digital assistant (PDA), or tablet computer associated with the driver or passenger(s) of vehicle 210. As such, mobile device 220 may be included within the vehicle 210 and, in some instances, may be used to independently collect vehicle performance and/or operational data, vehicle locational information, and/or mobile device usage data as well as to receive vehicle performance and/or operational data, vehicle locational information, driving assessment data, third party data, and the like from one or more computing systems (e.g., vehicle operation sensors 211, GPS 212, telematics device 213, on-board computer 215, driving assessment device 230, driving assessment server 235, and/or third party computing device(s) 240). Mobile computing device 220 may be configured to transmit the independently collected vehicle performance and/or operational data, vehicle locational information, mobile device usage data, and/or the received vehicle performance and/or operational data, vehicle locational information, driving assessment data, third party data, and the like to one or more computing devices (e.g., telematics device 213, on-board computer 215, driving assessment device 230, driving assessment server 235, and/or third party computing device(s) 240).

In one example, mobile device 220 may be configured to execute a program and/or application (e.g., telematics application, driving assessment application 217, and the like) that provides computer-executable instructions for independently detecting vehicle performance and/or operational data, vehicle locational information, and mobile device usage data and/or receiving vehicle performance and/or operational data, vehicle locational information, driving assessment data, third party data, and the like from one or more internal and/or external computing systems. With respect to independent vehicle performance and/or operational data and vehicle informational information detection and collection, mobile device 220 may be equipped with one or more accelerometers and/or GPS systems which may be accessed by the mobile device 220 after executing computer-executable instructions of the software program and/or application (e.g., telematics application, driving assessment application 217, and the like) to determine vehicle location (e.g., longitude, latitude, and altitude), heading (e.g., orientation), velocity, acceleration, direction, cornering (e.g., acceleration during turning), and other driving data.

The program and/or application may provide further computer-executable instructions that cause mobile device 220 to determine unlocking and/or usage in relation to the vehicle performance and/or operational data and/or vehicle locational information. In doing so, it may be determined whether a driver is driving distracted by using their mobile device while driving. Unlocking may correspond to an unlocking event which may be an occurrence of a user activating mobile device 220, inputting a passcode or biometric data (e.g., facial recognition, fingerprint, or the like), or otherwise initiating use of the mobile device 220. In some instances, the accelerometers and/or gyroscope of the mobile device 220 may be utilized identify user interaction with mobile device 220 during operation of vehicle 210. Further, the identification of user interaction with mobile device 220 via the accelerometers and/or gyroscope may incorporate machine learning algorithms.

For example, driving assessment application 217 may include executable instructions which cause mobile device 220 to determine unlocking and/or utilization when vehicle 210 is traveling above a predetermined velocity threshold (e.g., 10 mph, 25 mph, and the like), accelerating and/or decelerating above a predetermined acceleration or deceleration threshold (e.g., 30 ft/s$^2$, 60 ft/s$^2$, and the like), cornering above a predetermined acceleration or deceleration threshold (e.g., 30 ft/s$^2$, 60 ft/s$^2$, and the like), and/or at a predetermined location (e.g., school, church, restaurant, bar, and the like). In some instances, the program and/or application may provide further computer-executable instructions that cause mobile device 220 to generate a user interface to receive inputs from a user and provide outputs of the driving assessment system 200. Additionally and/or alternatively, the mobile device 220 may be configured to execute a web browser (e.g., an application for accessing and navigating the Internet) to access a webpage providing an interface for the driving assessment system 200.

Mobile computing device 220 may be configured to perform one or more of the methods and/or processes corresponding to the vehicle telematics based driving assessment as described in further detail below independently and/or in conjunction with one or more sensors and/or computing devices such as sensors 211, GPS 212, telematics device 213, on-board computer 215, driving assessment device 230, driving assessment server 235, and/or third party computing device(s) 240. In particular, mobile device 220 may be configured to perform the processes in combination with, and/or independently of, vehicle 210 and corresponding components (e.g., sensors 211, GPS 212, telematics device 213, and on-board computer 215), driving assessment device 230, and driving assessment server 235, as well as third party computing device(s) 240 in instances in which they are used. In performing such methods, mobile device 220 may be configured to detect, store, and transmit vehicle performance and/or operational data, vehicle locational information, and/or mobile device usage data. Furthermore, mobile device 220 may be configured to receive, store, and transmit vehicle performance and/or operational data, vehicle locational information, driving assessment data, third party data, and/or data produced during the performance of the methods corresponding to the vehicle telematics based driving assessment from sensors 211, GPS 212, telematics device 213, on-board computer 215, driving assessment device 230, driving assessment server 235, and/or one or more third party computing devices 240.

The driving assessment system 200 may include a driving assessment server 235. The driving assessment server 235 may be a computing device containing some or all of the hardware/software components as the vehicle telematics assessment device 100 of FIG. 1. In some instances, the analysis of the vehicle performance and/or operational data, vehicle locational information, mobile device usage data, third party data, and the like, as described in further detail below, may be performed by driving assessment server 235. In such instances, any one, or combination of, sensors 211, GPS 212, telematics device 213, on-board computer 215, mobile device 220, driving assessment device 230, and one or more third party computing devices 240 may transmit data to driving assessment server 235. Such data may include any of the above-mentioned vehicle performance and/or operational data, vehicle locational information, mobile device usage data, third party data, and the like. Upon receipt of the data, driving assessment server 235, alone or in combination, with driving assessment device 230, mobile device 220 and/or on-board computer 215 may be able to perform the processes outlined below.

The one or more third party computing devices 240 may contain some or all of the hardware/software components as the vehicle telematics assessment device 100 of FIG. 1. Each of the one or more third party computing devices 240 may be respectively associated with a particular entity related to the management of locational information (e.g., locational information corresponding to restaurants, bars, schools, churches, banks, automated teller machines (ATMs), daycares, gyms, sporting arenas, and the like), road and highway information (e.g., locational information associated with roads and highways), traffic regulation information (e.g., street-by-street speed limit information), traffic pattern information (e.g., actual and/or expected aggregate traffic velocity data), and crime statistical data (e.g., locational information corresponding to vehicle theft, accidents, impaired driving citations, speeding citations, and the like). As such, each of the one or more third party computing devices 240 may store data corresponding to the particular entity to which it is associated. Thus, the one or more third party computing devices 240 may be configured to communicate with driving assessment device 230, and in some examples also to any one of on-board computer 215, mobile device 220, and/or driving assessment server 235 in order to provide information corresponding to the particular entity that each of the one or more third party computing devices 240 corresponds. Additionally and/or alternatively, the one or more third party computing devices 240 may be configured to receive data from driving assessment device 230, and in some examples, also from vehicle sensors 211, GPS 212, telematics device 213, on-board computer 215, mobile device 220, and/or driving assessment server 235.

As stated above, driving assessment system 200 also may include one or more networks, which may interconnect one or more of vehicle 210 and the components associated therewith (e.g., vehicle operation sensors 211, GPS 212, telematics device 213, vehicle communication system 214, on-board computer 215, and the like), mobile device 220, driving assessment device 230, driving assessment server 235, and one or more third party computing devices 240. For example, driving assessment system 200 may include network 250. Network 250 may include one or more subnetworks (e.g., local area networks (LANs), wide area networks (WANs), or the like).

Figure 3:
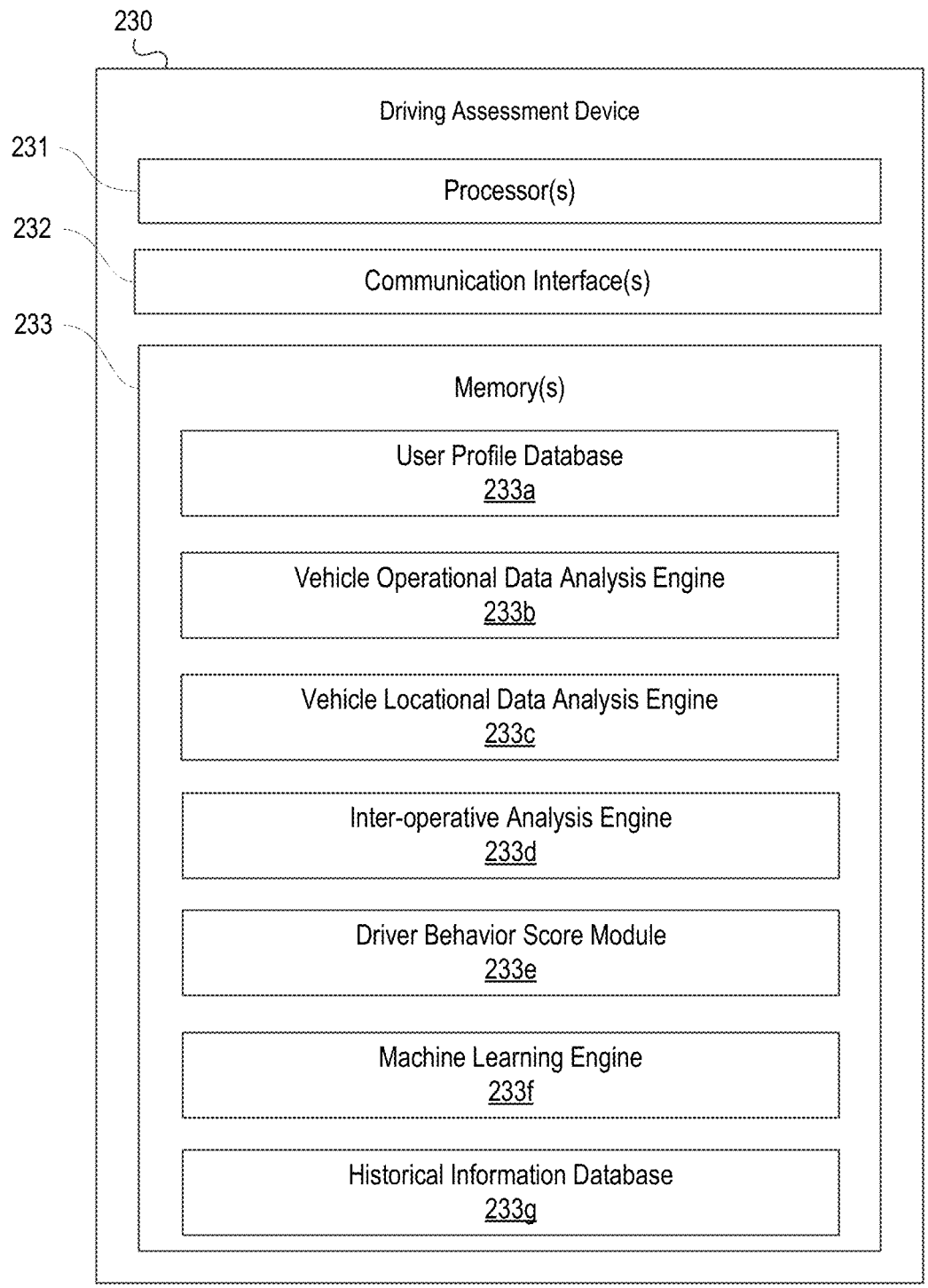
FIG. 3 illustrates an example computing environment for a vehicle telematics driving assessment application, in accordance with one or more aspects described herein.

Referring to FIG. 3, driving assessment device 230 may include processor(s) 231, communication interface(s) 232, and memory 233. A data bus may communicatively couple processor(s) 231, communication interface(s) 232, and memory 233. Communication interface(s) 232 may be a network interface configured to support communication between driving assessment device 230 and one or more networks (e.g., network 250).

Memory 233 may include one or more program modules, engines, and/or databases having instructions that when executed by processor(s) 231 cause driving assessment device 230 to perform one or more functions described herein. In some instances, the one or more program modules engines, and/or databases may be stored by and/or maintained in different memory units of driving assessment device 230. For example, memory 233 may have, store, and/or include a user profile database 233a, vehicle operational data analysis engine 233b, vehicle locational data analysis engine 233c, inter-operative analysis engine 233d, driver behavior score module 233e, machine learning engine 233f, and historical information database 233g.

User profile database 233a may store information corresponding to a user of driving assessment application 217 installed on mobile device 220 and/or on-board computer 215. In some instances, the user of the driving assessment application 217 may be the owner of vehicle 210. Accordingly, the information stored in user profile database 233a may relate to insurance account and/or policy information associated with the owner, vehicle information associated with the owner, financial information associated with the owner, and information as pertaining to the owner's usage of the vehicle operational data analysis engine 233b, vehicle locational data analysis engine 233c, inter-operative analysis engine 233d, driver behavior score module 233e, machine learning engine 233f, and historical information database 233g.

Vehicle operational data analysis engine 233b may have instructions that direct and/or cause driving assessment device 230 to receive vehicle operational data from vehicle 210 and, in particular, one or more components associated therewith (e.g., vehicle operation sensors 211, GPS 212, telematics device 213, vehicle communication system 214, on-board computer 215, and the like), as well as mobile device 220. The vehicle operational data analysis engine 233b may have further instructions that direct and/or cause driving assessment device 230 to identify velocity events (e.g., velocity of vehicle 210 above a predetermined velocity threshold), acceleration events (e.g., acceleration of vehicle 210 above a predetermined acceleration threshold), and/or braking events (e.g., deceleration of vehicle 210 above a predetermined deceleration threshold when the velocity of the vehicle is greater than a predetermined velocity threshold) associated with a trip.

In some instances, the identification of velocity, acceleration, and/or braking events may be related to a number of occurrences within a driving trip and/or an amount of time occurring within the driving trip. For example, vehicle operational data analysis engine 233b may store instructions that direct and/or cause driving assessment device 230 to identify a number of velocity events (e.g., a number of instances in which the velocity of vehicle 210 surpasses a predetermined velocity threshold during a driving trip) and/or an amount of time a velocity event occurred (e.g., an amount of time in which the velocity of vehicle 210 surpasses a predetermined velocity threshold during a driving trip).

In regard to the various predetermined thresholds associated with the velocity, acceleration, and/or braking events mentioned above, each of the thresholds of a similar type may correspond to an identical value or different values. For instance, the predetermined velocity threshold associated with the velocity event may be of a first predetermined velocity threshold value and the predetermined velocity threshold associated with the braking event may be of either an identical value to the first predetermined velocity threshold value or a different value to the first predetermined velocity threshold value.

Vehicle locational data analysis engine 233c may store instructions that direct and/or cause driving assessment device 230 to receive vehicle locational information from vehicle 210 and, in particular, one or more components associated therewith (e.g., vehicle operation sensors 211, GPS 212, telematics device 213, vehicle communication system 214, on-board computer 215, and the like), as well as mobile device 220. The vehicle locational data analysis engine 233c may have further instructions that direct and/or cause driving assessment device 230 to identify, based on the vehicle locational information, information corresponding to a trip such as starting information and destination information, a time range, a time of day, a day of week, one or more roads on which vehicle 210 travelled, a number of miles travelled, and the like. In some instances, the vehicle locational data analysis engine 233c include additional instructions that direct and/or cause driving assessment device 230 to determine a number of haversine miles (e.g., straight-line distance) and a total distance travelled by vehicle 210 between the starting point and destination of a trip, as well as to calculate a ratio between the haversine miles and total distance travelled by vehicle 210.

Inter-operative analysis engine 233d may have or include instructions that enable driving assessment device 230 to determine and/or identify, based on the destination information generated by vehicle locational data analysis engine 233c, a type of location (e.g., home, restaurants, bars, schools, churches, banks, ATMs, daycares, gyms, sporting arenas, and the like) associated with the destination information. Additionally, the inter-operative analysis engine 233d may store further instructions that direct and/or cause driving assessment device 230 to identify, based on the one or more roads identified by the vehicle locational data analysis engine 233c, speed limits associated with each of the one or more roads. Furthermore, the inter-operative analysis engine 233d may store further instructions that direct and/or cause driving assessment device 230 to compare the vehicle operational data (e.g., vehicle velocity data) with the speed limits associated with each of the one or more roads to identify a number of miles driven, percentage of miles driven, and/or time driven by the vehicle 210 during the trip where the velocity of the vehicle 210 was greater than a predetermined velocity threshold over the corresponding speed limit of the road. In some instances, such calculations may be based off of, and/or include, actual and/or expected aggregate traffic velocity data associated with each of the one or more roads identified. Such processes may be performed at driving assessment device 230, prior to being shared with any third party computing device(s) 240, as will be described in more detail below.

Driver behavior score module 233e may store instructions that direct and/or cause driving assessment device 230 to calculate a behavior score for the driver of vehicle 210 (e.g., user of driving assessment application 217 on on-board computer 215 and/or mobile device 220) based on the vehicle operational data and vehicle locational information, as well as the refined data generated by vehicle operational data analysis engine 233b, vehicle locational data analysis engine 233c, and/or inter-operative analysis engine 233d. In some instances, the behavior score may indicate the likelihood of the driver being involved in an accident, where a low behavior score (e.g., 1) may indicate a low probability of the driver being in an accident and a high behavior score (e.g., 100) may indicate a high probability of the driver being involved in an accident.

Additionally and/or alternatively, the behavior score may be utilized by the driving assessment device 230 to categorize the driver based on the likelihood of being involved in an accident and determine and/or identify an insurance policy for the driver based on the categorization. For example, drivers within a first range of behavior scores (e.g., 1-10) may be identified with a first class or category of insurance policies with low premiums, drivers within a second range of behavior scores (e.g., 11-20) may be identified with a second class or category of insurance policies with higher premiums than the first class, drivers within a third range of behavior scores (e.g., 21-30) may be identified with a third class or category of insurance policies with higher premiums than the second class, and so on.

In some instances, the driver behavior score module 233e may utilize machine learning algorithms from machine learning engine 233f to aide in generating the behavior scores. The machine learning engine 233f may have or include instructions that direct and/or cause driving assessment device 230 to set, define, and/or iteratively redefine parameters, rules, and/or other settings stored in historical information database 233g and used by driver behavior score module 233e in generating the driver behavior scores. As such, a behavior score associated with a driver may dynamically reflect the likelihood of the driver being involved in an accident based on the variables provided in the vehicle operational data and vehicle locational information, as well as the refined data generated by vehicle operational data analysis engine 233b, vehicle locational data analysis engine 233c, and/or inter-operative analysis engine 233d. Accordingly, the driver behavior score and the machine learning algorithms used to calculate the score may vary on a trip by trip basis.

Driver behavior score module 233e may calculate the driver behavior score on a trip by trip basis based on the vehicle operational data and vehicle locational information for each particular trip and/or over a plurality of trips and/or portion of trips. For example, vehicle operational data and vehicle locational information may be aggregated for a vehicle, operator, and/or all vehicles and/or operators on an insurance policy over all driving trips over a predetermined period of time (e.g., day, week, month, year, etc.). Additionally and/or alternatively, vehicle operational data and vehicle locational information may be aggregated for a vehicle, operator, and/or all vehicles and/or operators on an insurance policy over a predetermined number of trips (e.g., 50 trips, 100 trips, 1000 trips, etc.). As such, the driver behavior score may be reflective of driver behavior on a trip by trip basis, over the predetermined period of time, and/or over the predetermined number of trips. While the description provided below describes identifying the driver behavior score in regard to a particular driving trip, it is contemplated that the trip may be one of a plurality of trips taken over the predetermined period of time and/or within the predetermined number of trips and that the behavior score may be calculated for the predetermined period of time and/or for the predetermined number of trips.

Historical information database 233g may be configured to store historical data corresponding to vehicle operational data and vehicle locational information of previous trips, the data produced by the vehicle operational data analysis engine 233b, vehicle locational data analysis engine 233c, and/or inter-operative analysis engine 233d based of the vehicle operational data and vehicle locational information of the previous trips, as well as behavior scores associated with such trips. As stated above, in some instances, such data may be utilized by machine learning engine 233f to calibrate, train and/or validate machine learning algorithms used by driver behavior score module 233e in calculating the driver behavior scores. The historical information database 233g may also store information related to the management of locational information (e.g., locational information corresponding to restaurants, bars, schools, churches, banks, ATMs, daycares, gyms, sporting arenas, and the like), road and highway information (e.g., locational information associated with roads and highways), traffic regulation information (e.g., street-by-street speed limit information), and crime statistical data (e.g., locational information corresponding to vehicle theft, accidents, drunk driving citations, speeding citations, and the like).

The driving assessment device 230 may train a driver behavior score module 233e (e.g., using machine learning engine 233f) for estimating a safety score using training data that includes trip conditions data, mobility status data, driving data, trips data, passenger presence data, driver information data, history data, visited points of interest, and/or audio, video, and/or wireless signals captured by driving assessment device 230. For example, the training data set may tend to indicate how safely a driver was driving in various conditions, such as with or without passengers, during certain weather conditions, during certain road conditions, during the day versus at night, near points of interest, and in other such conditions. The indicators of safety may include accident data, tickets, license suspensions and/or cancellations, the cost of insuring a driver, and the like. In some embodiments, such a driver behavior score module 233e may be trained to output a continuous value indicating an estimated insurance premium (e.g., in dollars) over a given period (e.g., monthly). Additionally or alternatively, a driver behavior score module 233e may be trained to output a discrete value indicating, for example, an estimated range of an insurance premium (e.g., in dollars) over a given period (e.g., monthly). For example, the model may classify a driver into one of several discrete insurance premium ranges.

With further reference to FIG. 2, the telematics device 213 also may collect information regarding the vehicle's location, driver's route choice, whether the driver follows a given route, and to classify the type of trip (e.g. commute, errand, new route, gig drive etc.) via a global positioning system (GPS) 212.

In certain examples, collection and analysis of telematics data may be performed in response to a user creating an account with the driving assessment application 217 installed on driving assessment device 230, mobile device 220 and/or on-board computer 215. Moreover, the steps described below as being performed by mobile device 220 and/or driving assessment device 230 may be performed by any one, or combination of, on-board computer 215, mobile device 220, driving assessment device 230, and/or driving assessment server 235. Further, for each variable of the telematics data, a value may be calculated corresponding to a number (e.g. quantity of occurrences), ratio, percentage, duration, amount, range, and the like.

In some examples, driving assessment device 230 and/or mobile device 220 may pair, via a short-range communication interface (e.g., Bluetooth, Bluetooth Low Energy, near-field communication (NFC), radio frequency identification (RFID), and the like), with one or more of vehicle sensors 211, GPS 212, telematics device 213, and/or on-board computer 215 of vehicle 210 by way of a comparable short-range communication interface associated with the one or more of vehicle sensors 211, GPS 212, telematics device 213, and/or on-board computer 215. In some examples, vehicle 210 may receive a positive vehicle ignition event (e.g., key turn and/or button press turning engine on) from a driver of vehicle 210. As stated above, the driver of vehicle 210 may be associated with mobile device 220. Subsequently, one or more of vehicle sensors 211, GPS 212, telematics device 213, and/or on-board computer 215 of vehicle 210 may transmit an indication of the positive vehicle ignition event to mobile device 220. The transmission may be performed through the communication interface. The mobile device 220 may then receive the indication of the positive vehicle ignition event from one or more of vehicle sensors 211, GPS 212, telematics device 213, and/or on-board computer 215 of vehicle 210 through the paired short-range communication interface. In some instances, the indication of the positive vehicle ignition event may further serve as an indication of trip commencement.

Additionally and/or alternatively, other measures may be used to identify the commencement of a vehicle trip. For example, processes such as geo-fencing, fused sensing, GPS-based speed threshold analysis, and the like may be used alone or in combination to identify trip commencement. Further, such processes may be analyzed through machine learning algorithms to filter out false trips and identify true trip commencement. In any event, the mobile device 220 may launch and/or activate the driving assessment application 217 in response to receiving the indication of the positive vehicle ignition event and/or the other processes used in identifying trip commencement. In some instances, the mobile device 220 may launch and/or activate the driving assessment application 217 in response to a direct input provided to mobile device 220 by the driver of vehicle 210. In such instances, the above-described pairing and related vehicle ignition event steps may be omitted.

In some aspects, mobile device 220 may collect vehicle operational data and vehicle locational information associated with vehicle 210 and corresponding to a trip of the vehicle 210 through the driving assessment application 217. The vehicle operational data and vehicle locational information may be collected by way of one or more accelerometers and/or GPS systems of the mobile device 220. Additionally or alternatively, the mobile device 220 may receive the vehicle operational data and vehicle locational information associated with vehicle 210 from one or more of vehicle sensors 211, GPS 212, telematics device 213, and/or on-board computer 215 by way of vehicle communication system 214 of vehicle 210 through the paired short-range communication interface.

The driving assessment application 217 may instruct the mobile device 220 to isolate certain telematics data from the vehicle operational data and the vehicle locational information. In particular, the mobile device 220 may isolate vehicle operational data corresponding to the trip relating to velocity events (e.g., velocity of vehicle 210 above a predetermined velocity threshold), acceleration events (e.g., acceleration of vehicle 210 above a predetermined acceleration threshold), and/or braking events (e.g., deceleration of vehicle 210 above a predetermined deceleration threshold when the velocity of the vehicle is greater than a predetermined velocity threshold), as well as unlocking events of the mobile device 220 during one or more periods in which the vehicle 210 had a velocity greater than a predetermined velocity threshold. The mobile device 220 may isolate vehicle locational information corresponding to the trip such as starting and destination information, a time range, a time of day, a day of week, miles traveled during the night, total miles traveled, route data, roads travelled, haversine miles (e.g., straight-line miles), ratio of haversine miles to total miles, and the like.

In instances in which the full form of the vehicle operational data and vehicle locational information was received, the driving assessment device 230 may analyze the telematics data in a manner similar to that performed, in some instances, by mobile device, as described above. In particular, the vehicle operational data analysis engine 233$b$ of the driving assessment device 230 may analyze telematics data associated with the vehicle (e.g., velocity events, acceleration events, braking events, and the like) and vehicle locational data analysis engine 233$c$ of the driving assessment device 230 may analyze data associated with the vehicle locational information (e.g., starting and destination information, a time range, a time of day, a day of week, miles traveled during the night, total miles traveled, route data, roads travelled, haversine miles, ratio of haversine miles to total miles, and the like).

Upon receiving the telematics data, the inter-operative analysis engine 233$d$ of the driving assessment device 230 may generate second order telematics data based off of the telematics data from the mobile device 220 and/or identified by vehicle operational data analysis engine 233$b$ and vehicle locational data analysis engine 233$c$. In some instances, the generation of the second order telematics data by inter-operative analysis engine 233$d$ may be performed in conjunction with additional data from historical information database 233$g$.

For example, inter-operative analysis engine 233$d$ may identify, based on the destination information isolated by mobile device 220 and/or identified by vehicle locational data analysis engine 233$c$, a type of location (e.g., home, restaurants, bars, schools, churches, banks, ATMs, daycares, gyms, sporting arenas, and the like) associated with the destination information. The identification may be performed by comparing the destination information isolated by mobile device 220 and/or identified by vehicle locational data analysis engine 233$c$ with historical destination information stored in historical information database 233$g$. Additionally and/or alternatively, the inter-operative analysis engine 233$d$ may query a third party database related to the management of locational information.

The inter-operative analysis engine 233$d$ may identify, based on the one or more roads isolated by the mobile device 220 and/or identified by the vehicle locational data analysis engine 233$c$, speed limits associated with each of the one or more roads and compare the vehicle operational data (e.g., vehicle velocity data) with the speed limits associated with each of the one or more roads to identify a number of miles driven, percentage of miles driven, and/or time driven by the vehicle 210 during the trip where the velocity of the vehicle 210 was greater than a predetermined velocity threshold (e.g., 10 mph, 15 mph, or the like) over the corresponding speed limit of the road. In some instances, such calculations may be based off of, and/or include, actual and/or expected aggregate traffic velocity data associated with each of the one or more roads identified. The identification of the speed limits associated with the roads may be performed by comparing the information corresponding to the one or more roads isolated by mobile device 220 and/or identified by vehicle locational data analysis engine 233c with historical destination information stored in historical information database 233g. Additionally or alternatively, the inter-operative analysis engine 233d may query a third party database related to the management of traffic regulation information.

Additionally or alternatively, advanced metrics regarding the velocity data may be used in the comparisons with the speed limits associated with each of the one or more roads to identify a number of miles driven, percentage of miles driven, and/or time driven by the vehicle 210 during the trip where the velocity of the vehicle 210 was greater than a predetermined velocity threshold (e.g., 10 mph, 15 mph, or the like) over the corresponding speed limit of the road. For example, such advanced metrics may apply a weight and/or functional transformation of the vehicle velocity data in relation to the speed limits associated with each of the one or more roads to yield an advanced vehicle velocity relative to the speed limits. In some instances, the functional transformation may identify the maximum vehicle velocity above the speed limit and apply a square to the difference. Further, the advanced metrics regarding the vehicle velocity may be based off of, and/or include, actual and/or expected aggregate traffic velocity data associated with each of the one or more roads identified.

In some examples, vehicle 210 may receive a negative vehicle ignition event (e.g., key turn and/or button press turning engine off) from a driver of vehicle 210. One or more of vehicle sensors 211, GPS 212, telematics device 213, and/or on-board computer 215 by way of vehicle communication system 214 of vehicle 210 may transmit an indication of the negative vehicle ignition event to driving assessment device 230 and/or mobile device 220. The transmission may be performed through the communication interface as described above.

The driving assessment device 230 and/or mobile device 220 may receive the indication of the negative vehicle ignition event from one or more of vehicle sensors 211, GPS 212, telematics device 213, and/or on-board computer 215 of vehicle 210 through the paired short-range communication interface. In some instances, the indication of the negative vehicle ignition event may further serve as an indication of trip conclusion. The mobile device 220 may then transmit a deactivation notification to driving assessment device 230. The mobile device 220 may close and/or deactivate the driving assessment application 217 in response to receiving the indication of the negative vehicle ignition event. Accordingly the driving assessment application 217 may be activated and deactivated responsive to respectively receiving the positive and negative vehicle ignition events, thus minimizing power consumption on mobile device 220 by the driving assessment application 217, increasing bandwidth availability of network 250 by reducing the likelihood of non-driving-related data transmissions from mobile device 220, and increasing processing efficiency at mobile device 220.

Additionally and/or alternatively, other measures may be used to identify the termination of a vehicle trip. For example, processes such as geo-fencing, fused sensing, GPS-based speed threshold analysis, and the like may be used alone or in combination to identify trip termination. Further, such processes may be analyzed through machine learning algorithms to filter out false trip terminations and identify true trip termination. In some instances, the mobile device 220 may close and/or deactivate the driving assessment application 217 in response to a direct input provided to mobile device 220 by the driver of vehicle 210. In such instances, a deactivation notification may be provided before deactivation occurs.

In some examples, the driving assessment device 230 may receive a deactivation notification. Subsequently, the driver behavior score module 233e of driving assessment device 230 may calculate a behavior score for the driver of vehicle 210 for the trip based on the actionable trip data of vehicle operational data and vehicle locational information isolated by mobile device 220 and/or indicated by vehicle operational data analysis engine 233b and vehicle locational data analysis engine 233c, as well as the second order actionable data generated by inter-operative analysis engine 233d.

In particular, the behavior score may be calculated for the trip based on one or more of the type of location associated with the destination information, time range, time of day, day of week, number of miles traveled during the night, number of velocity events, number of braking events, number of unlocking events of the mobile device 220 during periods in which the vehicle 210 had a velocity greater than a first predetermined velocity threshold, the amount of time the vehicle 210 traveled greater than a second predetermined velocity threshold, the number of braking events greater than a predetermined deceleration threshold when the velocity of the vehicle 210 was greater than a third predetermined velocity threshold, percentage of miles driven by the vehicle 210 during the trip where the velocity of the vehicle 210 was greater than a fourth predetermined velocity threshold over the corresponding speed limit associated with a road on which the vehicle 210 was driving, and/or the ratio between the straight-line distance associated with the trip and the total distance travelled by the vehicle 210 during the trip.

In some instances, the driver behavior score module 233e may utilize machine learning algorithms such as logistic regression, ordinary least squares, linear regression, k-means clustering, naïve Bayes classifier, adaptive boosting, and the like from machine learning engine 233f to aide in generating the behavior score. As such, the machine learning engine 233f may have or include instructions that direct and/or cause driving assessment device 230 to apply computational weights to certain parameters used in calculating the behavior score based on the efficacy or lack thereof of previous behavior score calculations in reflecting the likelihood of the driver being involved in an accident.

In some aspects, the driver behavior score module 233e of driving assessment device 230 may use the behavior score to categorize the driver based on the likelihood of being involved in an accident. As described above, the behavior score may indicate the likelihood of the driver being involved in an accident, where a low behavior score (e.g., 1) may indicate a low probability of the driver being in an accident and a high behavior score (e.g., 100) may indicate a high probability of the driver being involved in an accident. Drivers within a first range of behavior scores (e.g., 1-10) may be identified with a first class or category of insurance policies with low premiums, drivers within a second range of behavior scores (e.g., 11-20) may be identified with a second class or category of insurance policies with higher premiums than the first class, drivers within a third range of behavior scores (e.g., 21-30) may be identified with a third class or category of insurance policies with higher premiums than the second class, and so on.

The driver behavior score module 233e of driving assessment device 230 may identify an insurance policy for the driver based on the insurance policy class or category corresponding to the behavior score categorization. The driver behavior score module 233e may store the data (e.g., vehicle operational information, vehicle locational information, driving data, machine learning algorithms and weights, driver behavior score, driver behavior score categorization, and insurance policy) in historical information database 233g. The driver behavior score module 233e may also analyze the data to determine if a safe driving threshold has been met, e.g., signifying that the data may be shared with a third party device or third party server, as described in more detail below.

Figure 4:
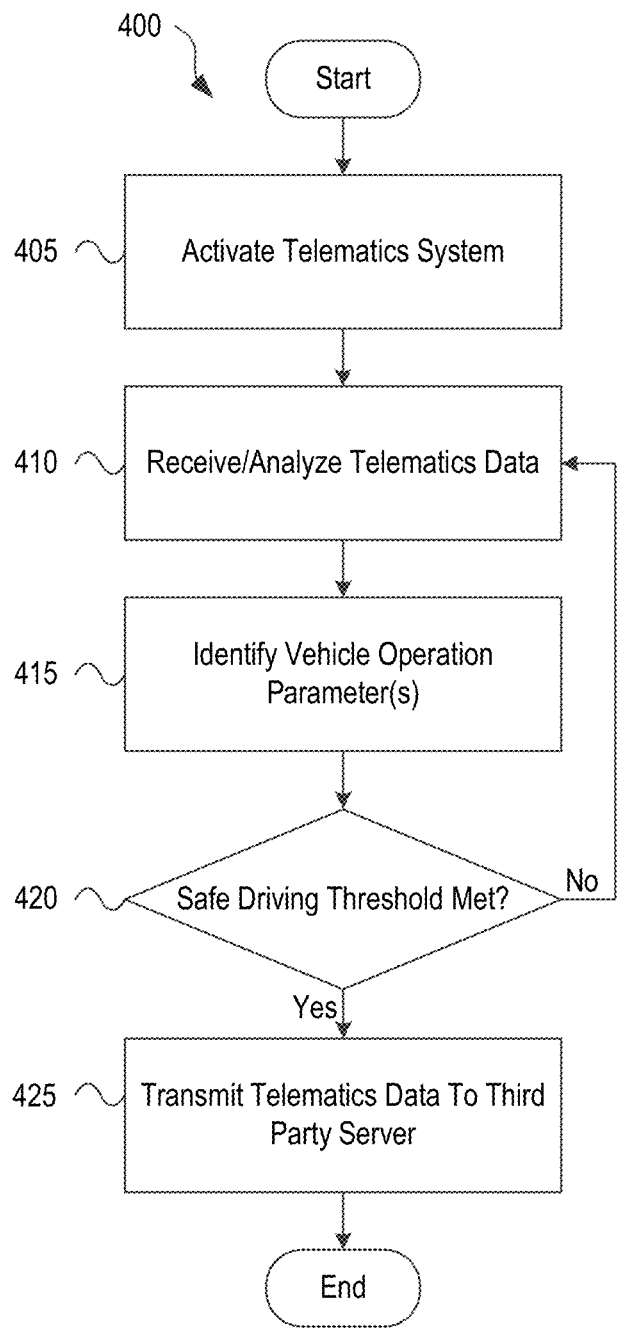
FIG. 4 illustrates a flowchart of example method steps for receiving and analyzing vehicle telematics data, and selectively sharing vehicle telematics data, in accordance with one or more aspects described herein.

FIG. 4 illustrates a flowchart 400 for one example method for receiving and analyzing telematics data, determining whether a safe driving threshold has been met, and transmitting the telematics data to a third party device based on the determining. Initially, at step 405, a telematics system associated with a vehicle is activated. The telematics system may be configured to collect telematics data associated with operation of a vehicle. In some examples, the telematics system may include any combination of telematics device 213, vehicle operation sensors 211, GPS 212, on-board computer 215, vehicle communication system 214, and/or driving assessment application 217. The driving assessment device 230 may additionally pair, via the communication interface 232, with the vehicle communication system 214 and/or the on-board computer 215, and subsequently, receive an indication of a positive ignition event prior to activation of the telematics system. In such examples, activating the telematics system at step 405 may be performed responsive to receiving the indication of the positive ignition event. Similarly, the driving assessment device 230 may receive, from the vehicle communication system 214 and/or the on-board computer 215, an indication of a negative ignition event (e.g., parking the vehicle, turning the car engine off); and may deactivate the telematics system in response to receiving the indication of the negative ignition event.

Activation of the telematics system may cause the telematics system to collect telematics data associated with operation of the vehicle during a window of time (e.g., a duration of time of a trip, a predetermined duration of time such as a predetermined number of seconds, minutes, or the like). In some examples, activating the telematics system may be performed responsive to determining a start of a driving session (e.g., based on indication of an ignition event, an engine start indicator, change in gear of vehicle, detection of a mobile device in a vehicle, or the like). At step 410, a driving assessment device may receive telematics data from the telematics system and may analyze the telematics data, as described above, e.g., with respect to the various components of the driving assessment device 230. The driving assessment device 230 may be located within, integrated with, or mounted to the vehicle.

At step 415, based on the analysis of the telematics data, one or more vehicle operation parameters may be identified by the driving assessment device. For example, the telematics system may include a GPS, and the telematics data may then include geo-location data and the one or more parameters may include a geographic zone of preferred driving. In such examples, the analysis may include determining whether the geo-location data is indicative of the vehicle staying within the geographic zone of preferred driving. In some examples, the one or more parameters may include origin destination pairs, and the analysis may include determining whether the geo-location data is indicative of origin-destination pairs that deviate from a typical commuting pattern associated with the vehicle. In some examples, the telematics system may include a biometric device and the telematics data may then include biometric data and the one or more parameters may include biometric information associated with an operator of the vehicle. In some examples, the telematics system may include one or more sensors, such as an on-board diagnostic accelerometer, and the one or more parameters may include information associated with movement of the vehicle. The one or more vehicle operation parameters may include destination information corresponding to a trip, a time range of the trip, velocity events that occurred during the trip, braking events that occurred during the trip, a time of day during the first window of time, a day of week during the first window of time, a number of miles traveled during daytime, a number of miles traveled during nighttime, and the like. Identifying the vehicle operation parameters may include calculating a driving behavior score during the first window of time, e.g., based on the time of day during the first window of time, the day of week during the first window of time, the number of miles traveled during daytime, the number of miles traveled during nighttime, and the like.

At step 420, the driving assessment device may determine if the one or more vehicle operation parameters and/or driving behavior score meet a safe driving threshold. In some examples, the safe driving threshold may be based on safe driving practices and/or based on driving behavior associated with a lower likelihood of vehicle accidents. If the safe driving threshold has not been met, the process may return to step 410 and continue to receive and analyze telematics data.

If the safe driving threshold has been met, the driving assessment device may transmit the telematics data to a third party device or third party server at step 425. The telematics data may be transmitted, e.g., via the communication interface 232 of the driving assessment device 230. In some examples, the one or more parameters, e.g., the one or more parameter for which the safe driving threshold was met, may additionally be transmitted to the third party device, along with the related telematics data. In some examples, a sharing prompt may be displayed on a display, e.g., a display of the driving assessment device 230, where the sharing prompt indicates that the one or more parameters meets (or does not meet) the safe driving threshold. Transmitting the telematics data to the third party device may include the driving assessment device receiving a user interaction with the sharing prompt indicating an agreement or a confirmation to share the telematics data with the third party.

Aspects of the present disclosure enable telematics data to be collected and analyzed, e.g., by a device within and/or mounted to a vehicle, prior to sharing with any third party entities, thus providing technological improvements as compared to existing systems. Indeed, with regard to telematics data (e.g., for automobile insurance), user privacy is of particular concern.

Aspects of the present disclosure provide systems and methods for the collection of such data without the above-described drawbacks. For example, users may download a safe driving assessment application for a mobile device that may enable the (local) collection of telematics data. The telematics data may be collected and stored locally until, e.g., a safe driving threshold has been met and/or a user has agreed to share such telematics data with a third party. In some examples, upon initially enrolling is a telematics data program, a user may be rewarded with a first insurance premium discount. After collecting telematics data, determining that a safe driving threshold has been met based on analysis of the telematics data, and sharing such telematics data with a third party, the user may be rewarded with a second insurance premium discount that is higher than the first insurance premium discount. Thus, a user may be rewarded for simply enrolling in a program that collects data from a user's device (a bring-your-own-data (BYOD) program) and may be further rewarded when or if data is shared with a third party. In some examples, the safe driving assessment application may determine if the vehicle has stayed within a specified geo-location zone. In some examples, telematics data may only be collected during certain times of the day, e.g., in accordance with certain user specifications. Furthermore, in some instances sharable driving data is isolated from the totality of driving data collected from the telematics system, bandwidth availability is further increased because of the reduction in data transmissions by transmitting only the sharable driving data. Such aspects of the disclosure address major technological deficiencies in existing systems and, accordingly, provide meaningful technological improvements.

The above steps may be accomplished via an apparatus that includes a telematics system configured to collect telematics data associated with a vehicle, one or more processor, and memory storing instructions that, when executed by the one or more processors, cause the apparatus to perform at least some of the above-described steps. In some examples, the telematics system may be configured to measure, collect, and transmit telematics data associated with the vehicle.

The above steps may be accomplished via a system that includes a first computing device and a second computing device. The first computing device may be associated with (e.g., positioned within and/or mounted to) a vehicle, and may include a telematics system configured to collect telematics data during operation of the vehicle, a wireless communication interface, a processor, a wireless communication interface, and memory storing instructions that, when executed by the processor, cause the first computing device to receive telematics data from the telematics system during a first window of time, identify, based on the telematics data, one or more parameters associated with operation of the vehicle, determine whether the one or more parameters meets a safe driving threshold, and marking the one or more parameters as suitable for sharing upon determining that the one or more parameters meets the safe driving threshold. The second computing device may be in signal communication with the first computing device, and may include a processor, and memory storing instructions that, when executed by the processor, cause the second computing device to receive, from the first computing device, the one or more parameters marked as suitable for sharing.

Figure 5:
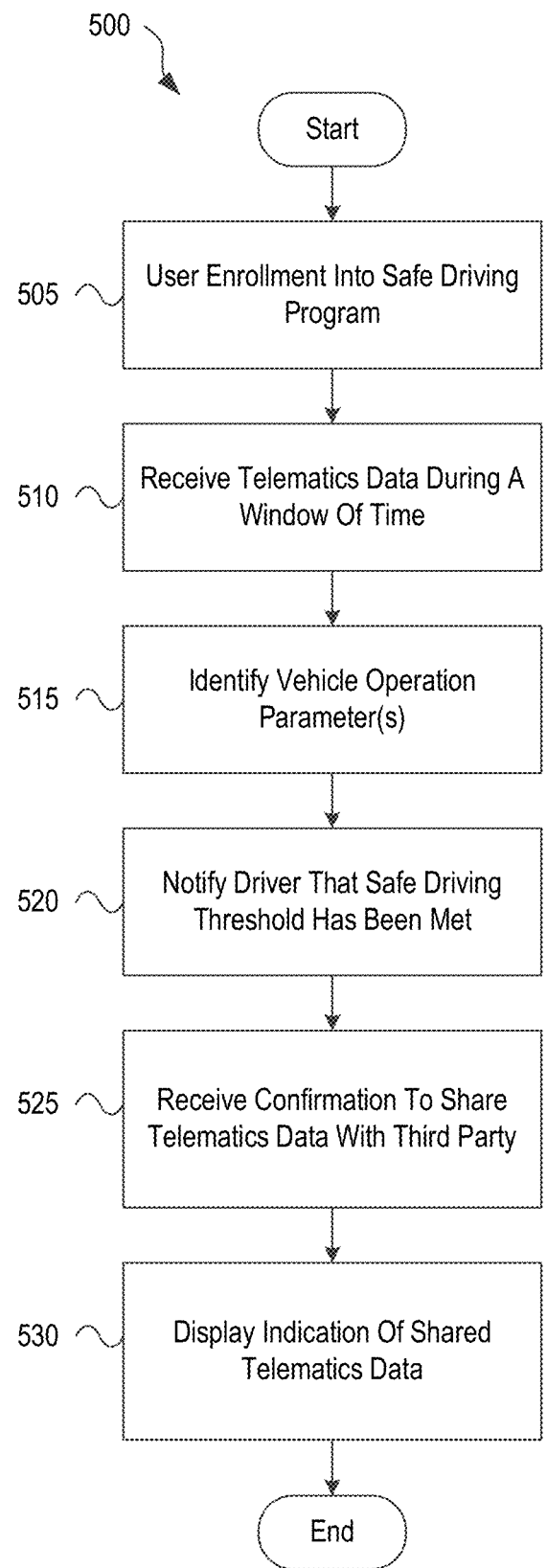
FIG. 5 illustrates a flowchart of example method steps for receiving and analyzing vehicle telematics data, and receiving user verification for selectively sharing vehicle telematics data, in accordance with one or more aspects described herein.

For instance, referring now to FIG. 5, a flowchart 500 of example steps for receiving and analyzing vehicle telematics data, and receiving user verification for selectively sharing vehicle telematics data is shown. The driving assessment device 230, the driving assessment server 235, the on-board computer 215 and/or the driving assessment application 217 may be used to perform these method steps of flowchart 500.

At step 505, user enrollment into a safe driving program (also referred to herein as a safe driver program) may be received. In some examples, user enrollment may be a precursor step to activating the telematics systems at step 405 of FIG. 4. User enrollment may include one or more identifiers that associate a user account with a telematics system of a vehicle and/or one or more user permissions or customized options associated with capture and sharing of user data. In some examples, activating the telematics system at step 405 may include receiving a notification that a driver associated with the vehicle has enrolled in a safe driver program with the third party. User enrollment in the safe driver program may include an indication or notification that the telematics data will not be transmitted to the third party until a specified safe driving threshold is met and/or upon receiving user confirmation. The third party may be an insurance entity, and meeting the safe driving threshold may result in providing the user with a discounted insurance premium.

FIG. 6 illustrates an example user interface 600 for a safe driving program enrollment that driving assessment device 230 may present or cause another device to present (e.g., via display device 117). The user interface 600 may include a prompt for a user to opt in or opt out of a safe driving programs that entails the collection of telematics data. For example, the prompt may include the message "Would you like to enroll in the Safe Driving Program?" along with interactive links ("Yes" and "No") for a user to select in response to the message. The interface 600 may include one or more details associated with the safe driving program, such as an indication of a discount or reward that a user may be able to achieve via the safe driving program (e.g., "Enrollment in the Safe Driving Program could reduce your premium by as much as 30%."). In that regard, such an indication may include one or more personalized aspects that are specific to the user or user account. In order to further protect user privacy, a user may opt to be notified before telematics data is to be shared, even after enrollment in a safe driving program (e.g., "Would you like to be notified before your data is shared?). Selection of such a notification may result, e.g., after a safe driving threshold has been met based on analysis of received telematics data, in a notification to the user and subsequent user confirmation before telematics data is shared, as will be described in more detail below.

Referring back to FIG. 5, at step 510, telematics data may be received during a window of time (e.g., a predetermined duration of time). At step 515, one or more vehicle operation parameters may be identified based on the telematics data received during the window of time (e.g., similar to the identification of vehicle operation parameters at step 415 of FIG. 4). The one or more vehicle operation parameters may be associated with aspects of safe vehicle operation or with a lower likelihood of involvement in a vehicle accident. The one or more vehicle operation parameters may be used to determine if a safe driving threshold has been met, similar to determining if the safe driving threshold has been met at step 420 of FIG. 4.

At step 520, a driver associated with the vehicle or a user associated with the user account may receive a notification that a safe driving threshold has been met. The notification may include a discount notification indicating that a discounted insurance premium is available to an insurance policy holder of the vehicle, e.g., upon determining that one or more parameters of the telematics data meets the safe driving threshold. FIG. 7 illustrates an example user interface 700 for displaying a safe driving notification to a driver or a user (e.g., via display device 117, or mobile device 220). As illustrated, the user interface 700 may include notification that a safe driving threshold has been met (e.g., "Congratulations! Your safe driving has unlocked a discount on your insurance premium of 30%. Would you like to share your driving data with Insurance Company to receive this discount?). The user interface 700 may further include additional user prompts related to the safe driving notification, to confirm whether or not the telematics data is to be shared, to view the related driving data, change user account settings, and the like (e.g., "Yes, share my data so I can receive this discount," "No, I do not wish to share my data at this time," "View driving data").

Subsequent to the notification, a confirmation to share telematics data with a third party may be received at step 525. For example, referring back to the interface 700 of FIG. 7, the confirmation may be received based on a user selecting the option shown as "Yes, share my data so I can receive this discount." Similar to step 430 of FIG. 4, telematics data may be transmitted to a third party device or third party server responsive to receiving confirmation to share the telematics data. Subsequently, at step 530, a user device, such as mobile device 220, driving assessment device 230, and/or on-board computer 215, may display an indication that the telematics data has been shared. In some examples, the a portion of the display may provide a first graphic indicating that telematics data is not being shared with the third party, and a second graphic indicating that data is being shared with the third party.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. An apparatus comprising:
   a telematics system configured to collect telematics data associated with operation of a vehicle;
   a communication interface;
   one or more processors; and
   memory storing instructions that, when executed by the one or more processors, cause the apparatus to:
   receive an indication of a positive ignition event from a vehicle control computer associated with the vehicle;
   activate, responsive to the positive ignition event, the telematics system to collect telematics data associated with operation of the vehicle during a window of time, the telematics data including first Global Positioning System (GPS) origin-destination data representing a location of the telematics system;
   identify, based on the telematics data, one or more parameters associated with operation of the vehicle, the one or more parameters including second GPS origin-destination data, stored at the memory, representing a pattern of commutes;
   determine a comparison of the first GPS origin-destination data to the second GPS origin-destination data;
   determine, using the comparison, whether the one or more parameters meets a safe driving threshold;
   display, on a display of the apparatus, a sharing prompt indicating that the one or more parameters meet the safe driving threshold;
   receive a user interaction with the sharing prompt, the user interaction indicating a confirmation to share the telematics data with a third-party; and
   upon determining that the one or more parameters meets the safe driving threshold and responsive to receiving the user interaction indicating the confirmation to share the telematics data with the third-party, transmit, via the communication interface, the telematics data to a remote computing device associated with the third-party.

2. The apparatus of claim 1, wherein activating the telematics system includes receiving a notification that a driver associated with the vehicle has enrolled in a safe driver program with the third-party, wherein the safe driver program includes an indication that the telematics data will not be transmitted to the third-party until the safe driving threshold is met.

3. The apparatus of claim 1, wherein the safe driving threshold is associated with a discounted insurance premium, wherein the third-party is an insurance entity, and wherein the memory further stores instructions that, when executed by the one or more processors, cause the apparatus to:
   upon determining that the one or more parameters meets the safe driving threshold, display, on a display of the apparatus, a discount notification indicating that the discounted insurance premium is available to an insurance policy holder of the vehicle.

4. The apparatus of claim 1, wherein the apparatus is located within, integrated with, or mounted to the vehicle.

5. The apparatus of claim 1, wherein the telematics system includes a GPS device to generate the first GPS origin-destination data.

6. The apparatus of claim 1, further comprising a display, wherein a portion of the display provides a first graphic indicating that data is not being shared with the third-party, and a second graphic indicating that data is being shared with the third-party.

7. The apparatus of claim 1, wherein the one or more parameters associated with the operation of the vehicle include at least one of: destination information corresponding to a trip, a time range of the trip, velocity events that occurred during the trip, or braking events that occurred during the trip.

8. The apparatus of claim 1, wherein analyzing the telematics data to identify one or more parameters associated with operation of the vehicle includes calculating a driving behavior score during the window of time.

9. A method comprising:
   receiving an indication of a positive ignition event from a vehicle control computer associated with a vehicle;
   activating a telematics system to collect telematics data associated with operation of the vehicle during a window of time responsive to receiving the indication of the positive ignition event;
   receiving, by a computing device associated with the vehicle, telematics data from the telematics system during the window of time;
   identifying, by the computing device and based on the telematics data, one or more parameters associated with operation of the vehicle, the one or more parameters including first Global Positioning System (GPS) origin-destination data;
   determining, by the computing device, whether the one or more parameters meets a safe driving threshold by comparing the first GPS origin-destination data to second GPS origin-destination data indicating a historical driving pattern, wherein the safe driving threshold is associated with a discounted insurance premium for a driver of the vehicle;
   displaying, on a display of the computing device, a sharing prompt indicating that the one or more parameters meets the safe driving threshold; and
   receiving, at the computing device, a user interaction with the sharing prompt indicating a confirmation to share the telematics data with an insurance entity; and upon determining that the one or more parameters meets the safe driving threshold and responsive to the user interaction indicating the confirmation to share the telematics data with the insurance entity, transmitting the telematics data to a remote server to cause a driving behavior-based insurance premium value associated with the vehicle to increase or decrease.

10. The method of claim 9, wherein activating the telematics system includes receiving a notification that a driver associated with the vehicle has enrolled in a safe driver program with the insurance entity, wherein the safe driver program includes an indication that the telematics data will not be transmitted to the insurance entity until the safe driving threshold is met.

11. The method of claim 9, further comprising:
upon determining that the one or more parameters meets the safe driving threshold, displaying, on a display of the computing device, a discount prompt indicating that the discounted insurance premium is available to an insurance policy holder of the vehicle.

12. The method of claim 9, wherein identifying the one or more parameters associated with operation of the vehicle includes calculating a driving behavior score during the window of time.

13. The method of claim 9, further comprising:
pairing the computing device with the vehicle control computer associated with the vehicle.

14. A system comprising:
a telematics system configured to collect telematics data during operation of a vehicle; and
a first computing device associated with the vehicle, wherein the first computing device comprises:
a wireless communication interface;
a processor; and
a memory device storing instructions that, when executed by the processor, cause the first computing device to:
receive an indication of a positive ignition event from a computer associated with the vehicle;
receive, responsive to the positive ignition event, telematics data from the telematics system during a window of time the telematics data including global positioning system (GPS) origin-destination data;
identify, based on the telematics data, one or more parameters associated with operation of the vehicle, the one or more parameters being determined from the GPS origin-destination data and including at least one of a braking value representing an amount of braking events or an acceleration value representing an amount of acceleration events;
determine whether the braking value or the acceleration value is above or below a predetermined threshold value stored in the memory device;
display, on a display of the first computing device, a sharing prompt indicating that the braking value or the acceleration value is above, or below the predetermined threshold value;
receive a user interaction with the sharing prompt, the user interaction indicating a confirmation to share the telematics data with a third-party entity; and
upon determining that the braking value or the acceleration value is above or below the predetermined threshold value and responsive to receiving the user interaction indicating the confirmation to share the telematics data with the third-party entity, sending, to a second computing device in signal communication with the first computing device, an indication of the braking value or the acceleration value to cause a change to an insurance premium value stored by the second computing device.

15. The system of claim 14, wherein the telematics system includes a Global Positioning System (GPS), wherein the one or more parameters includes a geographic zone of preferred driving, and wherein the memory device of the first computing device further stores instructions that, when executed by the processor, cause the first computing device to:
determine whether the telematics data is indicative of the vehicle staying within the geographic zone of preferred driving.

16. The system of claim 14, wherein the telematics system includes a biometric device configured to collect biometric data associated with an operator of the vehicle, and wherein the one or more parameters includes biometric data associated with an operator of the vehicle.

17. The system of claim 14, wherein the telematics system includes one or more sensors configured to collect data associated with movement of the vehicle, and wherein the one or more parameters includes at least one of: destination information corresponding to a trip, a time range of the trip, velocity events that occurred during the trip, or braking events that occurred during the trip.

18. The system of claim 14, wherein analyzing the one or more parameters includes calculating a driving behavior score associated with the telematics data during the window of time.

* * * * *